United States Patent
Rulkens et al.

(10) Patent No.: US 9,556,310 B2
(45) Date of Patent: Jan. 31, 2017

(54) PROCESS FOR PRODUCING A SEMI-AROMATIC SEMI-CRYSTALLINE POLYAMIDE

(71) Applicant: DSM IP ASSETS B.V., Heerlen (NL)

(72) Inventors: Rudy Rulkens, Echt (NL); Eric Grolman, Echt (NL); Geert Adelina Rudolf Vanden Poel, Echt (NL); Renier Henricus Maria Kierkels, Echt (NL); Theo Joseph Cuypers, Echt (NL); Constantine D. Papaspyrides, Echt (NL); Athanasios D. Porfyris, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/899,404

(22) PCT Filed: Jun. 16, 2014

(86) PCT No.: PCT/EP2014/062513
§ 371 (c)(1),
(2) Date: Dec. 17, 2015

(87) PCT Pub. No.: WO2014/202506
PCT Pub. Date: Dec. 24, 2014

(65) Prior Publication Data
US 2016/0137781 A1    May 19, 2016

(30) Foreign Application Priority Data

Jun. 19, 2013 (EP) .................................... 13172829

(51) Int. Cl.
| C08G 69/30 | (2006.01) |
| C08G 69/26 | (2006.01) |
| C08L 77/00 | (2006.01) |
| C08L 77/06 | (2006.01) |

(52) U.S. Cl.
CPC ............. *C08G 69/265* (2013.01); *C08G 69/30* (2013.01); *C08L 77/00* (2013.01); *C08L 77/06* (2013.01)

(58) Field of Classification Search
CPC .......... C08L 77/00; C08L 77/06; C08G 69/26; C08G 69/265; C08G 69/30
See application file for complete search history.

(56) References Cited

U.S. PATENT DOCUMENTS

| 3,696,074 | A | 10/1972 | Tsuda et al. |
| 3,839,296 | A | 10/1974 | Campbell |
| 4,018,746 | A | 4/1977 | Brinkmann et al. |
| 2009/0098325 | A1* | 4/2009 | Uchida ..................... B32B 1/08 428/36.91 |
| 2010/0063191 | A1 | 3/2010 | Hirono |

FOREIGN PATENT DOCUMENTS

| CN | 101600763 | 9/2009 |
| CN | 102911499 | 8/2011 |
| GB | 801733 | 9/1958 |

OTHER PUBLICATIONS

International Search Report for PCT/EP2014/062513, mailed Oct. 15, 2014, 4 pages.
Written Opinion of the ISA for PCT/EP2014/062513, mailed Oct. 15, 2014, 4 pages.

* cited by examiner

*Primary Examiner* — Gregory Listvoyb
(74) *Attorney, Agent, or Firm* — Nixon & Vanderhye P.C.

(57) ABSTRACT

The invention relates to a process for the preparation of semi-crystalline semi-aromatic polyamide by direct solid-state polymerization of a diamine-dicarboxylic acid salt, comprising steps of (a) providing at least two salts of terephthalic acid and diamine, wherein each of these diamine/terephthalic acid salts is in solid state and has a melting temperature of at least Tx, wherein Tx is at least 260° C.; (b) preparing a mixture of the diamine/terephthalic acid salts, while retaining the salts in solid state; and (c) heating the mixture obtained from step (b) in the solid state to a temperature (T-c) in the range from 200° C. to 260° C., under a pressure below the saturation vapor pressure of water at said temperature, thereby condensing and polymerizing the salts and forming a semi-crystalline semi-aromatic polyamide in solid form.

16 Claims, No Drawings

PROCESS FOR PRODUCING A SEMI-AROMATIC SEMI-CRYSTALLINE POLYAMIDE

This application is the U.S. national phase of International Application No. PCT/EP2014/062513 filed 16 Jun. 2014, which designated the U.S. and claims priority to EP Patent Application No. 13172829.7 filed 19 Jun. 2013, the entire contents of each of which are hereby incorporated by reference.

The invention relates to a low temperature process for producing a semi-crystalline semi-aromatic polyamide.

Semi-crystalline semi-aromatic polyamides are of commercial interest because of their physical properties, including a high melting temperature allowing higher use temperature. Polyamides in general and semi-aromatic polyamides in particular, are generally produced by melt-polymerization or solution polymerization of diamine and dicarboxylic acid monomers, optionally followed by solid-state post condensation to further increase the molecular weight.

Aromatic dicarboxylic acids employed for semi-aromatic polyamides, such as isophthalic acid and terephthalic acid are less reactive than their aliphatic counterparts, such as adipic acid. Because of the higher melting points of the semi-crystalline semi-aromatic polyamides based on terephthalic acid, and lower reactivity of the aromatic dicarboxylic acids, generally higher reaction temperatures and longer reaction times are needed which can result in undesired side reactions.

Low temperature processes have been described, mostly for aliphatic polyamides, but are not widely employed industrially. U.S. Pat. No. 5,128,442 describes a low temperature process, wherein a solid salt of diamine and dicarboxylic acid, comprising a catalytically effective phosphorous compound intimately mixed with the diamine and dicarboxylic acid during the salt preparation, is polymerized in the solid state in two steps. The first condensation step was said to be usually carried out over a period of from 10 to 24 hours. The post condensation or final condensation step was carried out at a temperature above the melting temperature of the salt to 20° C. below the melting temperature of the resulting polyamide.

As mentioned in different articles, e.g. C. D. Papaspyrides and E. M. Kampouris, *Polymer,* 1986; 27: 1433-1436; C. D. Papaspyrides and E. M. Kampouris, *Polymer,* 1986; 27: 1437-1440; C. D. Papaspyrides, S. N. Vouyiouka and I. V. Bletsos, *Polymer,* 2006; 47: 1020-1027; C. D. Papaspyrides, *J. Polym. Sci., A.* 1994; 32: 451-456; S. N. Vouyiouka, C. D. Papaspyrides and R. Pfaender, *Macromol. Mater. Eng.* 2006; 291: 1504-1512; and summarized by R. Pfaender in the book on "Solid-state Polymerization" by. C. D. Papaspyrides and S. N. Vouyiouka, Wiley, 2009, page 167, the reaction rate of the solid process is not high enough and is significantly lower than for comparable melt or solvent processes. Catalysts are added to enhance the reaction rate. The problem of reactivity is known to be even more emphasized with aromatic dicarboxylic acids, such as terephthalic acid and isophthalic acid, which are known to be significantly less reactive than aliphatic dicarboxylic acids, such as adipic acid, as reported e.g. in the study of "The condensation Kinetics of Polyphthalamides: I. Diamines and Diacids of Dimethylesters" done by Malluche J.; Hellmann, G. P.; Hewel M.; Liedloff, H. J.; *Polym. Eng. Sci.* 2007, 47, 1589.

The aim of the present invention is to optimize a process for producing a semi-crystalline semi-aromatic polyamide at relatively low temperature, hence allowing for relatively short reaction times.

This aim has been achieved with the process according to claim 1 of the invention, wherein the semi-crystalline semi-aromatic polyamide is prepared by direct solid-state polymerization of a diamine/dicarboxylic acid salt, comprising steps of (a) providing at least two salts of terephthalic acid and diamine, wherein each of these diamine/terephthalic acid salts is in solid state and has a melting temperature of at least Tx, wherein Tx is at least 260° C.;

(b) preparing a mixture of the diamine/terephthalic acid salts, while retaining the salts in solid state;

(c) heating the mixture obtained from step (b) in the solid state to a temperature (T-c) in the range from 200° C. to Tx, under a pressure below the saturation vapour pressure of water at said temperature, thereby condensing and polymerizing the salts and forming a semi-crystalline semi-aromatic polyamide in solid form.

The effect of the process according to the invention is not only that the polymerization is conducted at relative low temperature, such that the salts and the resulting polyamide are kept in the solid state, but also that the polymerization of the salts in the mixture proceeds faster than for each of the salts separately under the same conditions, and completion of the condensation of the salts and polymerization into a semi-crystalline semi-aromatic polyamide is achieved in relatively short time. The combination of low reaction temperature and short reaction times, together with maintaining the salt in the solid state and the polymer in the semi-crystalline state as in the process according to the invention, significantly limits the possible occurrence of side reactions. Furthermore, the semi-crystalline semi-aromatic polyamide so obtained can be a mixture of two or more semi-aromatic semi-crystalline polyamides. Moreover, the polyamide may show characteristics of a copolyamide, or even a mixture of copolyamides, even though the salts used may consist of homopolymer precursor salts only. After melt-processing, the semi-crystalline semi-aromatic polyamide shows properties similar to those of a homogeneous blend or even a highly randomized copolyamide. Melt-processing can be done, for example, in a compounding step.

With the term melting temperature of the salt (Tm-salt), is herein understood the peak temperature of the endothermic melting peak measured by DSC by the method according to ISO 11357-1/3 (2011) with a scan rate of 20° C./min in the first heating cycle.

The process according to the invention comprises providing at least two diamine/terephthalic acid salts, being diamine/dicarboxylic acid salts of terephthalic acid and diamine. The salts suitably comprise or even fully consist of homopolymer precursor salts. The salts may be mixed in the appropriate ratio to ultimately obtain a copolyamide high in terephthalic acid content in the desired composition. The ratio may be varied widely, with a large part of a first salt and only a small amount of a second salt, thereby obtaining almost a homopolymer. One or more of the salts, in particular the minor one or minor ones, can also be a copolymer precursor salt. When combined with a homopolymer precursor salt in the process according to the invention, the effect of overall increased polymerization speed is obtained as well.

With the expression "at least two salts" it is understood that the salts comprise two or more different salts. As the salts are salts of terephthalic acid, the differences are in the diamines in the salts. The diamines may be selected from a wide range of diamines, as long as the diamine/terephthalic acid salts have a melting temperature of at least 260° C., and the semi-crystalline polyamides produced are in the solid state at the maximum temperature applied in step (c).

Where the salts have a melting temperature substantially higher than 260° C. a higher maximum temperature in step (c) can be applied.

Therefore, in one embodiment of the invention, the temperature Tx is 280° C., and the process comprises the steps of
(a) providing at least two salts of terephthalic acid and diamine, wherein each of these diamine/terephthalic acid salts is in solid state and has a melting temperature of at least 280° C.;
(b) preparing a mixture of the diamine/terephthalic acid salts, while retaining the salts in solid state;
(c) heating the mixture obtained from step (b) in the solid state to a temperature (T-c) in the range from 220° C. to 280° C., under a pressure below the saturation vapour pressure of water at said temperature, thereby condensing and polymerizing the salts and forming a semi-crystalline semi-aromatic polyamide in solid form.

This embodiment has the advantage that a further increased polymerization speed is achieved, while a copolyamide product is obtained that is still in an essentially solid state.

In another embodiment, the temperature Tx is 260° C. and the process comprises the steps of
(a) providing at least two salts of terephthalic acid and diamine, wherein each of these diamine/terephthalic acid salts is in solid state and has a melting temperature of at least 260° C.;
(b) preparing a mixture of the diamine/terephthalic acid salts, while retaining the salts in solid state;
(c) heating the mixture obtained from step (b) in the solid state to a temperature (T-c) in the range from 200° C. to 260° C., under a pressure below the saturation vapour pressure of water at said temperature, thereby condensing and polymerizing the salts and forming a semi-crystalline semi-aromatic polyamide in solid form.

This embodiment has the advantage that a broader range of different XT salts, i.e. salts of terephthalic acid (T) and diamine (X), can be used in the mixture, while a copolyamide product is obtained that is still in an essentially solid state.

Suitably, the diamine/terephthalic acid salts used in the process according to the invention are chosen from C2-C12 diamines, i.e. diamines comprising 2-12 carbon atoms per diamine molecule. Preferably, at least one diamine/terephthalic acid salt comprises a C2-C10 diamine. More preferably, the diamine/terephthalic acid salts comprise, or even consist of
a first salt (A) of terephthalic acid and a first diamine, and
a second salt (B) of terephthalic acid and a second diamine,
wherein the first diamine and the second diamine are different diamines and each one thereof is selected from the group consisting of C2-C10 diamines. In other words both the first diamine and the second diamine consist of a diamine with 2-10 carbon atoms. The advantage thereof is an enhanced reaction rate in combination with a lower risk of sticking of either the reacting salt or the polyamide formed.

In a preferred embodiment thereof, (A) and (B) comprise at least one salt of a C2-C8 diamine, more preferably both. The advantage thereof is an enhanced reaction rate in combination with further reduced risk of sticking of either the reacting salt or the polyamide formed.

The ratio of salts can be varied over a wide range. Suitably, the salt mixture comprises 2.5-97.5 mol % of (A) and 97.5-2.5 mol % of (B), wherein the mol % are relative to the total molar amount of diamine/terephthalic acid salts. Mixing a relative small amount of one salt into a relative large amount of another salt has already a significant effect on the polymerization speed.

Preferably, the salt mixture comprises 5-95 mol % of (A) and 95-5 mol % of (B), wherein the mol % are relative to the total molar amount of diamine/terephthalic acid salts. With a higher minimum amount of a second salt mixed with a first salt a higher reaction speed is obtained. Further increase from 10 mol % and above, i.e. with salt mixtures comprising 10-90 mol % of (A) and 90-10 mol % of (B), has a further contribution to the reaction speed, though less significant, and also allows for a large flexibility in creating copolymers with different composition and tunable properties like the melting behaviour.

The salt mixture may be a binary mixture, comprising two salts, or a ternary or higher mixture, comprising three or more salts. A ternary or higher mixture of diamine/terephthalic acid salts has the advantage that the reaction speed is even higher.

More particular, next to (A) and (B), the diamine/terephthalic acid salts provided in step (a), mixed in step (b) and heated in step (c), may comprise a further salt or further salts of terephthalic acid and diamine or diamines, wherein the diamine or diamines are different from the first diamine and the second diamine. These further salt or salts are together referred to as salt (C). The amount of (C), relative to the total amounts of salts may vary over a wide range, as it may be composed of several different salts. Suitably, (A) and (B) are the main components, with a combined amount of more than 50 mol %, and (C) constitutes a minor component, with a combined amount of less than 50 mol %, relative to the total molar amount of diamine/terephthalic acid salts. The amount of (C) is preferably in the range of 2.5-35 mol %, and the combined amount of (A) and (B) in the range of 65-97.5 relative to the total molar amount of diamine/terephthalic acid salts. The effect of further increased reaction speed is already observed at low amounts of (C).

The diamines in the diamine/terephthalic acid salts are different from each other. The diamine or diamines in salt (C) are different from those of salt (A) and (B) and may be, for example a C12 diamine. Preferably, the diamine or diamines in salt (C) are also C2-C10 diamines, resulting therein that all the diamines are selected from the group consisting of C2-C10 diamines.

In the process according to the invention, diamine/terephthalic acid salts are used suitably based on C2-C12 diamines. The C2-C12 diamines can be selected from a wide range of components, including linear aliphatic diamines, branched aliphatic diamines, cycloaliphatic diamines and aryldialkylamines, provided that the corresponding diamine/terephthalic acid salts and polyamide resulting thereof have a melting point of at least 260° C. Suitable linear aliphatic diamines include all linear aliphatic C2-C12 diamines, named 1,2-ethylenediamine, 1,3-propylenediamine, 1,4-tetramethylenediamine (1,4-butane diamine), 1,5-pentamethylenediamine (1,5-pentanediamine), 1,6-hexamethylenediamine (1,6-hexanediamine), 1,7-heptamethylenediamine, 1,8-octamethylenediamine, 1,9-nonamethylenediamine, 1,10-decamethylenediamine, 1,11-undecamethylenediamine, 1,12-dodecanemethylenediamine. Suitable branched diamines include 2-methylpentamethylene diamine, 3,3'-dimethylpentamethylenediamine and 2-methyloctamethylene diamine. A suitable cycloaliphatic diamine is trans-1,4-cyclohexanediamine. Suitable aryldialkylamines are meta-xylylenediamine and para-xylylenediamine.

Preferably, the diamines in the main salt components, constituting more than 50 mol % and preferably at least 65 mol % are selected from C2-C10 diamines, more preferably from linear aliphatic C2-C10 diamines with an even number of carbon atoms, 1,4-cyclohexanediamine and meta-xylylenediamine. More preferably at least one diamine is selected from the group consisting of linear aliphatic C2-C8 diamines with an even number of carbon atoms, even more preferably a linear aliphatic diamine with 4 or 6 carbon atoms.

In the process according to the invention, diamine/terephthalic acid salts are provided in solid state. The solid state is distinguished from liquid and gas state in that the salts as provided show a melting point. The salts used in the process each have a melting temperature of at least 260° C. Herein the melting temperature is the melting temperature, measured on the separate salts, not on the salt mixture. Also the polyamides are obtained in solid form. The semi-aromatic polyamide is a semi-crystalline polymer suitably also having a melting temperature of at least 260° C. Preferably, the melting temperature of the semi-crystalline semi-aromatic polyamide is at least 270° C., more preferably at least 280° C. As mentioned before, the semi-crystalline semi-aromatic polyamide obtained as a solid in step (c) can be a mixture of two or more semi-aromatic semi-crystalline polyamides. Preferably each of these semi-crystalline semi-aromatic polyamides has melting temperature of at least 270° C., more preferably at least 280° C.

With the term melting temperature for the polymer (Tm-pol), is herein understood the peak temperature of the endothermic melting peak measured by DSC by the method according to ISO 11357-1/3 (2011) with a scan rate of 20° C./min in the first heating cycle.

The salts are mixed while retaining the salts in solid state and heated in the solid state thereby condensing and polymerizing the salts by direct solid-state polymerization to form a semi-aromatic semi-crystalline polyamide. In such a process the mixing, heating and polymerization are carried out without dispersing or dissolving the salts in a dispersing agent or solvent, more particularly in absence of a dispersing agent or solvent. A small amount of a liquid component may be present, preferably below 2 wt. %, more preferably below 1 wt. %, relative to the total weight of the salt. This does not exclude the presence of, for example, crystal water. Such water may be comprised by the salts, or one of the salts, but will evaporate upon heating since the heating is done under a pressure below the saturation vapour pressure of water.

The diamine/terephthalic acid salts used in the process according to the invention may be prepared by any method suitable for preparing salts of terephthalic acid and diamines. For example, the salts can be prepared by dissolving terephthalic acid and diamine in water, eventually under heating, and precipitating the salt by adding a non-solvent, eventually during or after cooling.

The salts used in the process according to the invention are suitably nearly equimolar or even equimolar salts, i.e. comprising the terephthalic acid and diamine in equimolar ratio. The salts may also comprise some excess of diamine or excess of terephthalic acid. Preferably, the ratio of terephthalic acid and diamine (TPA/DA) in the salts is in the range of 0.90-1.10, more preferably 0.95-1.05, and most preferably 0.98-1.02. Excess of dicarboxylic acid will result in lower molecular weight polyamides, but might be acceptable. A low molecular weight polyamide produced this way can be increased in molar mass by providing additional diamine during a solid-state post-condensation step. Excess of diamine may result in increased loss of diamine, but has a positive effect on attaining a higher molecular weight polyamide.

The salts are provided in the solid state, for example, as a powder or as a granular material such as compacted powder, or mixtures thereof. A powder is herein understood to be granular material consisting of discrete and substantially solid particles. These particles, also referred to as powder particles, suitably have a particle size of from sub-micron to about 2 mm or less. Granules will typically be of larger size than the powder particles, as each of these granules will comprise multiple powder particles. Suitably, the granules will have a particle size of from sub-millimeter to centimeter scale, generally from about 0.5 mm to 4 cm, for example from about 2 mm to about 2 cm. 8 mm or less, more particularly 5 mm or less, is preferred for further processing in an extruder.

The mixing may be performed, for example, by adding the salts in a mixing vessel, followed by stirring and/or tumbling, and/or grinding. Suitably, the salts in the mixture as obtained from the preparation step (b), consist of particles having a particle size distribution with a median particle size (d50) in the range of, for example 50-1000 μm and a d90 of at most 2 mm. Herein the particle size distribution is measured with laser granulometry by the method according to ISO 13320 at 20° C. Such particles suitably consist of agglomerates of fine crystallites.

The diamine/terephthalic acid salts may be provided in the form of a powder, suitably already having such particle size distribution. As the process is a direct solid-state polymerization process, carried out below the melting temperature of the salts and of the resulting polyamide, and any mixtures thereof, the resulting polyamide typically has a morphological structure, such as that of a free flowing powder or of a sintered, sticky, agglomerated or compacted powder, wherein the individual particles are still visible.

The mixture from step (b) is heated in step (c) to a temperature (T-c) in the range from 200° C. to 260° C. This temperature T-c does not need to be a fixed temperature, but may also be a temperature profile. The temperature profile can consist of, for example, a temperature ramp with fixed or variable temperature increments and/or decrements over time, or a step-wise increase or decrease of temperature, and any combination thereof.

During the heating the salt mixture may be kept for a time at a fixed temperature, for example between 130 and 200° C., under a pressure below the saturation vapour pressure of water at said temperature, in order to allow removal of any water in the salts, such as crystal water, if any.

If during step (c) a temperature ramp is applied above 200° C., the temperature is preferably increased at a heating rate of at most 5° C. per minute. By limiting the temperature ramp, the reaction speed and the production of water resulting from the condensation reaction can be better controlled.

The reaction mixture is kept at a temperature T-c within the said temperature range for a time sufficiently long to obtain a semi-aromatic semi-crystalline polyamide. The presence of a semi-aromatic semi-crystalline polyamide can be determined by DSC by observation of a melting peak for the semi-aromatic semi-crystalline polyamide in the first heating run. Meanwhile, the condensation of the salts will have proceeded to high conversion, which can be verified by DSC by disappearance, or largely so, of the endothermic peak for Tm-salt. Suitably, the conversion after step c) is at least 93%, preferably at least 95% and even more preferably at least 98%. The conversion is herein related to the amount of water released, relative to the theoretical weight loss, mentioned in the tables, which will result from the calculated weight amount of water arising from complete condensation reaction of diamines and terephthalic acid and being completely lost. Herein the water is condensation water released above 180° C. It can be measured by removal of the condensation water from the reactor, condensing the water and collecting it.

Suitably, the mixture is retained at a temperature T-c within the said temperature range for at least 1 hour, preferably at least 1.5 hours, or even better 2 hours. A longer reaction time leads to higher conversion and higher molecular weight polyamide and reduced risk of sticking of the material upon further post-condensation at higher temperature.

Also preferably, in step (c) the temperature of the mixture (T-c) is kept at least 5° C. below Tx, more preferably at least 10° C. below Tx, for at least 1 hour. The advantage thereof is that there is reduced risk of sticking of the salt and polymer powder during the solid state polymerization. T-c is preferably kept in the range from 210° C. to Tx–5° C., more preferably in the range from 220° C. to Tx–10° C., for at least 1 hour. In the embodiment with Tx being 280° C., T-c is preferably kept in the range from 230° C. to 275° C., more preferably from 240 to 270° C. for at least 1 hour. In the embodiment with Tx being 260° C., in step (c) the temperature of the mixture (T-c) is preferably kept for at least 1 hour in the range 210° C. to 255° C., more preferably from 220° C. to 250° C. A higher minimum temperature for T-c results in a higher condensation speed, while a lower maximum temperature for T-c reduces the risk of sticking of salt and polymer particles.

The reaction mixture is suitably held at the reaction temperature T-c for a time sufficient long to obtain a semi-aromatic semi-crystalline with a viscosity number (VN) of at least 15 ml/g. Preferably, the VN is at least 25 ml/g, more preferably at least 40 ml/g. The VN is herein measured in 96% sulphuric acid (0.005 g/ml) at 25° C. by the method according to ISO 307, fourth edition.

In the process according to the invention the mixture of diamine/terephthalic acid salts may comprise a polycondensation catalyst. Preferably the polycondensation catalyst is a phosphorous containing catalyst, for example sodium hypophosphite. The advantage is that the polymerization reaction speed is further enhanced. The catalyst may be added to and mixed with one or more of the salts or to the salt mixture. Alternatively, the catalyst may be included in the salt during the salt preparation. The catalyst is suitably used in a small amount, such as to limit the lowering the melting point of the salt, and thus still achieving the effects of the invention. The amount should be limited such that the melting temperature of the salt remains at least 260° C., preferably at least 270° C.

The process according to the invention might comprise a further step, wherein the semi-aromatic polyamide obtained from step (c) is subjected to a solid-state post-condensation step (d), wherein the semi-aromatic polyamide, having a melting temperature Tm-pol being above Tx, is heated to a temperature (T-d) above Tx and below Tm-pol, thereby further polymerizing the semi-aromatic polyamide and obtaining a semi-aromatic polyamide of higher molecular weight. Herein Tx is at least 260° C., and suitably at least 270° C. or even at least 280° C.

As mentioned before, the semi-crystalline semi-aromatic polyamide obtained as a solid in step (c) can be a mixture of two or more semi-aromatic semi-crystalline polyamides. These may be exhibited by different melting temperatures typically determined by DSC in the first heating. In that case Tm-pol is herein understood to be the lowest melting temperature.

Preferably, T-d is at least 10° C. below Tm-pol, more preferably at least 20° C. below Tm-pol and the polyamide is retained at said temperature T-d for at least 1 hour. A lower maximum for T-d reduces the risk of sticking of the polymer particles.

Suitably, the polyamide obtained after step (d) has a viscosity number (VN) of at least 25 ml/g, preferably, at least 40 ml/g, and more preferably at least 60 ml/g. The VN is herein measured in 96% sulphuric acid (0.005 g/ml) at 25° C. by the method according to ISO 307, fourth edition.

The polymerization step (c), and optionally also steps (b), or (d), or both, and optionally also (a), may be carried out under an inert atmosphere. Preferably, at least during step (c) the mixture is kept under an inert atmosphere.

The polymerization step (c), and optionally also steps (b), or (d), or both, and optionally also (a), may be carried out in any reactor, suitable for a direct solid-state polymerization process. The reactor may be, for example, a static reactor, a counter flow column reactor, a rotating vessel or a mechanically stirred reactor.

During the polymerization step (c) water will be produced as a result of the condensation reaction between terephthalic acid and the diamines. As the reaction is carried out at elevated temperature at a pressure below the saturation vapour pressure of water. Water vapour can result from evaporation of crystal water and from water produced by the condensation reaction of the salt. Suitably the water vapour is removed from the reactor during the polymerization. The advantage is that the pressure is more easily kept below the saturation temperature of water. Preferably the water vapour pressure is kept at a level below 40% of the total pressure in the system, more preferably below 20% or even below 10%. Also preferably the pressure in the reactor is kept below 10 bar, or even 5 bar absolute pressure. This limits the required wall thickness of the reactor vessel and thereby limits plant investment costs.

During the polymerization step (c) some diamine may be released from one or more of the diamine/terephthalic acid salts. This can result in some loss of diamine. Nevertheless, the condensation and polymerization reaction proceed fast. In order to keep the balance in TPA/DA ratio close to 1 to obtain a high molecular weight polyamide, it is preferred to limit the loss of diamine, or to compensate for lost diamine, Suitable measures include using a reflux condenser to retain the diamine in the reactor; recycling of diamine via a separate inlet; or replenishing additional diamine.

In a preferred embodiment, step (c) is carried out in a reactor, water being produced as water vapour during step (c) upon condensing of the salts and diamine being released as diamine vapour from one or more of the diamine/terephthalic acid salts are at least partly separated from each other thereby forming a water-rich fraction and a diamine-rich fraction, the water-rich fraction is removed and the diamine-rich fraction is retained in or recycled back into the reactor. The invention is further illustrated with the following examples and comparative experiments.

EXPERIMENTAL PART

Methods

Determination of Melting Temperature (Tm) and Melting Enthalpy (ΔHm) of Salts and Polymers by DSC Method The melting temperature and melting enthalpy of the salts and the polymers was determined by differential scanning calorimetry (DSC) applying the method according to ISO 11357-3 (2011) with a scan rate of 20° C./min in the first heating cycle ° C. resulting in Tm 1st heating. Where applicable for determining the crystallisation temperature and crystallisation temperature in the second heating cycle, the first heating cycle was up to 380° C. and a waiting time of 0 min at 380° was applied followed by immediate cooling. For the polymers also the crystallisation temperature during the cooling run (T-crystallization) and the melting temperature in the second heating run (Tm 2nd heating) were determined, applying a scan rate of 20° C./min in the cooling cycle and the second heating cycle.

Viscosity Number (VN)

The viscosity number (VN) was measured according to ISO 307, fourth edition. For the measurement a pre-dried polymer sample was used, the drying of which was performed under high vacuum (i.e. less than 50 mbar) at 80° C. during 24 hrs. Determination of the viscosity number was done at a concentration of 0.5 gram of polymer in 100 ml of sulphuric acid 96.00±0.15% m/m at 25.00±0.05° C. The flow time of the solution (t) and the solvent (to) were measured using a DIN-Ubbelohde from Schott (ref. no. 53020) at 25° C. The VN is defined as $$VN = \frac{\left(\frac{t}{t_0} - 1\right)}{c} = \left(\frac{t}{t_0} - 1\right) * 200$$

wherein:
VN=viscosity number, in ml/g
t=average flow time of the sample solution, in seconds
$t_0$=average flow time of the solvent, in seconds
c=concentration, in g/ml (=0.005)

Molar Ratio

The molar ratio of the different diamines in the salts and in the polymers was determined by NMR.

Salt Preparations

Preparation 4T Salt

A liquid mixture of 178.4 g (2.02 mol) 1,4-diamininobutane and 1650 g demineralized water was charged into a 6 liter 3 necked flask. Then, 326.7 g (1.97 mol) of terephthalic acid was added gradually over 10 minutes while stirring. This resulted in a fully transparent solution, while the temperature had increased to 60° C. The solution was then cooled while stirring to 4° C. by immersing the flask into a water/ice bath and 4 liters of ethanol was added to the reaction mixture, while stirring was applied. The precipitated salt was collected by filtration, washed with 500 ml ethanol and dried for 8 hours at 40° C. under a vacuum (50 millibar absolute), resulting in 475 g (95% yield) of the salt in the form of fine white powder.

Preparation 6T Salt

A liquid mixture of 168.66 g (1.45 mol) hexamethylenediamine and 1600 g demineralized water was charged into a 6 liter 3-necked flask. Then, 235.34 g (1.42 mol) of terephthalic acid was added gradually over 10 minutes while stirring. The mixture was heated to 100° C., resulting in a fully transparent solution. The solution was then cooled while stirring to 4° C. by immersing the flask into a water/ice bath and 2 liters of ethanol was added to the reaction mixture, while stirring was applied. The precipitated salt was collected by filtration, washed with 500 ml ethanol and dried for 16 hours at 90° C. under a vacuum (50 millibar absolute), resulting in 376 g (94% yield) of the salt in the form of fine white powder.

Preparation 8T Salt

A liquid mixture of 117.5 g (0.814 mol) 1,8-diaminooctane and 1600 g demineralized water was charged into a 6 liter 3 necked flask. Then, 133.8 g (0.806 mol) of terephthalic acid was added gradually over 10 minute while stirring. The mixture was heated to 104° C., resulting in a fully transparent solution. The salt solution was then cooled. The salt solution was then cooled while stirring to 15° C. by immersing the flask into a water bath. The precipitated salt was obtained by filtration, washed with 500 ml ethanol and dried for 8 hours at 60° C. under a vacuum (50 millibar absolute), resulting in 215 g (86% yield) of the salt in the form of fine white powder.

Preparation 10T Salt

A liquid mixture of 207.67 g (1.21 mol) 1,10-diamininodecane and 5367 g demineralized water was charged into a 6 liter 3 necked flask. Then, 196.33 g (1.18 mol) of terephthalic acid was added gradually over 10 minutes while stirring. The slurry was heated to 100° C. resulting in a fully transparent solution. The salt solution was then cooled while stirring to 4° C. by immersing the flask into a water/ice bath and the precipitated salt was obtained by filtration, washed with 500 ml ethanol and dried for 8 hours at 60° C. under a vacuum (50 millibar absolute), resulting in 368 g (92% yield) of the salt in the form of fine white powder.

Polymerization Experiments

Polymerization was performed in a small cup closed with a cap comprising a small opening for pressure balance with the environment. The salt or salts were weighted, and where applicable mixed, before being put in the cup. The cup was brought under nitrogen atmosphere, closed with the cap, and put in a heating cell. The heating cell was purged with nitrogen gas which was kept at atmospheric pressure. The heating cell with the cup inside was heated with a temperature ramp of 15° C./min from room temperature to 150° C.; and with a temperature ramp of 1.33° C./min from 150° C. to 235° C.; then the heating cell was retained at 235° C. with a retention time as indicated. After the retention at said temperature, and some intermediate time intervals, the weight loss was measured and compared with the theoretical weight loss. At the end, the cup was cooled to room temperature, and the resulting material analysed.

TABLE 1

Comparative Experiments: polymerization homopolyamide precursor salts.

| Experiment | CE-A | CE-B | CE-C | CE-D |
|---|---|---|---|---|
| Salt | 4T | 6T | 8T | 10T |
| Tm (° C.) | 298 | 292 | 279 | 280 |
| ΔHm (J/g) | 560 | 585 | 490 | 372 |
| Theoretical weight loss (wt. %) | 14.2 | 12.8 | 11.6 | 10.6 |
| Retention time at 235° C. (hours) [b] | 6 | 6 | (6) 9 | (4) ((6)) 10 |
| Wt. Loss above 200° C. (wt. %) [b] | 0.6 | 3.0 | (7.5) 11.5 | (3.1) ((5.6)) 11.1 |
| Polymer properties | | | | |
| Tm 1st heating (° C.) | 426 [c] | 375 | 340 | 320 |
| T-crystallization (° C.) | | 344 | 310 | 283 |
| Tm 2nd heating (° C.) | | 355 | 322/334 | 303/314 |
| Physical appearance [a] | F.P. | F.P. | F.P. | F.P. |

[a] physical appearance: polyamide products were obtained as free-flowing powder (F.P.)
[b] for experiments CE-C and CE-D weight loss after intermediate time intervals are reported. Retention times and corresponding weight loss results are presented within brackets.
[c] Thermal degradation during measurement of the melting temperature in the first heating prohibited measurement of T-crystallization and Tm-2nd heating.

TABLE 2

Examples: Polymerization of mix of homopolyamide precursor salts

| Experiment | EX-I | EX-II | EX-III | EX-IV | EX-V | EX-VI | EX-VII | EX-VIII |
|---|---|---|---|---|---|---|---|---|
| Salts | 6T & 4T | 6T & 8T | 8T & 6T | 6T & 10T | 10T & 4T | 6T & 10T & 4T | 6T & 4T & 10T | 6T & 4T |
| Composition (Molar Ratio) | 86/14 | 71/29 | 62/38 | 63/37 | 91/9 | 57/33/10 | 57/33/10 | 50/50 |
| Theoretical weight loss (wt. %) | 12.9 | 12.3 | 11.3 | 12.0 | 10.9 | 12.1 | 12.9 | 13.4 |
| Retention Time T (hours) | (6) 14 | 6 | 2 | 6 | 4 | 4 | (6) 10 | 10 |
| Wt. Loss above 200° C. (wt. %) | (5.9) 14.4 | 13.5 | 13.2 | 12.3 | 12.3 | 13.1 | (7.3) 13.5 | 14.9 |
| Polymer properties | | | | | | | | |
| Tm-1 1st heating (° C.) | 345 | 297 | 294 | 290 | 289 | 288 | 295 | 326 |
| Tm-2 1st heating (° C.) | 365 | 360 | 303 | 340 | 296/306 | 312 | 332 | 345 |
| T-crystallization (° C.) | 340 | 310 | 267 | 290 | 277 | / | / | / |
| Tm 2nd heating (° C.) | 363 | 337 | 296 | 317/335 | 289/304 | / | / | 330 |
| Composition (Molar Ratio) | 91/9 | | | 60/40 | 90/4 | 55/38/6 | 59/30/11 | 52/48 |
| Physical appearance [a] | F.P. | F.P. | F.P. | S.P. | F.P. | S.P. | F.P. | F.P. |

[a] physical appearance: polyamide products were obtained as free-flowing powder (F.P.), respectively slightly agglomerated powder (S.P.)
(b) for experiments EX-I and EX-VIII weight loss after intermediate time intervals are reported. Retention times and corresponding weight loss results are presented within brackets.

For the Examples in table 2, it was verified by applying longer retention time than indicated in the table there was hardly any further weight loss, indicating that the condensation of the salts was complete. By applying longer retention times or at the same or higher temperatures, the polyamides obtained could be post-condensed in the solid state to result in polyamides with higher molecular weight.

The experiments illustrate that the polymerization with salt mixtures in the examples according to the invention (Table 2) proceed faster than of the corresponding individual homopolyamide precursor salts in the comparative experiments (Table 1). Example I shows that conversion after 6 hours at 235° C. for the mixed salts of 6T and 4T was higher than for the corresponding individual salts processed under the same conditions and after the same time at 235° C. in Comparative Examples A and B. Example I presents clearly that the conversion degree is higher for the mixed salts of 6T and 4T than for the corresponding individual salts after 6 hours at 235° C. processed under the same conditions which is illustrated by the Comparative Examples A and B. The same result is obtained for the mixture of 6T and 8T salts as shown in Example II, when compared to the corresponding individual salts presented by means of Comparative Examples B and C. Example III exhibits the same mixture of 6T and 8T salts, in which the ratio of the salts is reversed i.e. a relative larger amount of 8T salt in the mixture. In this case full conversion is already reached within 2 hours at 235° C., whereas for the individual salts the conversion is still not complete after 6 hours at 235° C. Also for Examples IV and V, concerning combinations of 6T and 10T, respectively 10T and 4T salts, conversion is complete within 6 hours, respectively within 4 hours. It is noted that, for the latter, fast conversion is obtained by mixing in only a relative small amount of the second salt. These examples illustrates that mixing a less reactive salt with a more reactive salt, such as is shown for 4T with 6T or 10T, or for 6T with 8T or 10T, increases the condensation speed of the already more reactive salt as well as of the less reactive salt thereby speeding up the overall polymerization speed.

Examples I-V and VIII concern binary salt mixtures, whereas Examples VI and VII concern ternary salt mixtures. Example VI is a modification of Example IV, wherein next to 6T and 10T a small amount of 4T is added. The effect is that the polymerization speed is further enhanced, as the conversion is completed in even shorter time, compared to Example IV. Example VII is a modification of Example I, concerning a combination of 6T and 4T, wherein the relative amount of 4T has been increased and a small amount of 10T has been added. Also here, the effect is that the polymerization speed is further enhanced, as the conversion is completed in even shorter time, compared to Example I. Example VIII is a modification of Example I, concerning a combination of 6T and 4T, wherein the relative amount of 4T has been further increased. The melting temperature of the resulting product for Example VIII is lower than that of Example I, and even further below that of PA 6T, despite the use of a higher amount of 4T salt. This result is a clear indication that a more or less fully ranodomized copolyamide has been formed.

The polymers of Examples I, II, III, V, VII and VIII were obtained as free flowing powders (F.P.). The polymers of Examples IV and VI were obtained as a slightly sticking powder (S.P.), which could easily be broken up into a flowing powder by slight mechanical stirring. For the compositions of Examples IV and VI a free flowing polymer powder could also be obtained by slightly lowering the polymerization temperature, for example by 5-15° C., requiring a somewhat longer retention time at that temperature. Said retention time, however, was still shorter than needed for the individual salts to reach the same level of conversion under the same processing conditions and at the same polymerization temperature.

For the polyamides obtained in the Examples according to the invention, multiple melting temperatures are observed in the first heating cycle of the DSC measurements. The melting temperatures appear to be lower than those of individual homopolyamides. In the second heating cycle a single melting temperature is observed or two melting temperatures are observed, located in between the temperatures observed in the first heating cycle. For example in Example II, concerning the combination of 6T and 8T, the melting temperatures observed in the first heating cycle were 296.7° C. and 360° C., and the melting temperature observed in the second heating cycle was 336.9° C. The melting temperature of 8T homopolymer was observed to be 340° C. and that of 6T homopolymer 370° C. These results indicate that during the polymerization some copolymerization occurred, resulting in different copolyamides next to each other, and that during melting efficient mixing of the copolyamides occurred resulting in a more or less homogeneous melt blend, and in a copolyamide mixture with a melting temperature, or melting temperatures corresponding more or less with that of a fully randomized copolyamide made of the same combination of salts.

Example IX

Polymer Synthesis from a 6T and 4T Salt Combination (Molar Ratio 60/40) in a Stirred Reactor The polymerization was carried out in a double walled 1 liter electrically heated metal reactor equipped with a helically shaped stirring unit, an inert gas inlet and an exit for both the inert gas and the condensate gas, and thermocouples to measure the temperature of the reactor wall and of the reaction mixture inside the reactor. The reactor was charged with salt powder. The salt powder was stirred and a nitrogen gas purge of 5 gram per hour was applied to inertize the reactor content. Then the reactor content was heated by heating the reactor wall applying a programmed temperature profile and monitoring the temperature of the reactor content in the powder bed, meanwhile continuing the nitrogen gas purge and stirring of the reactor content at 75 rpm.

The reactor was filled with a mixture of 187.6 g of 4T salt and 312.42 g of 6T salt. The nitrogen gas purge was set and kept at 5 gram per hour gas volume at room temperature. The reactor content was inertized during 3 hours, before starting the heating profile. The reactor content was heated from 25 to 245° C. in 165 minutes, corresponding with a temperature ramp of 1.33° C./min. Then the temperature was further raised to 260° C. in 90 minutes, corresponding with a temperature ramp of 0.17° C./min. When reaching 260° C., a liquid mixture of 8 g hexamethylene diamine and 4 g 1,4-butane diamine was added drop wise through an inlet tube over 10 minutes. Then the temperature was kept at 260° C. for another 90 minutes. Then the reactor content was cooled from 260° C. to below 50° C. in 110 minutes. Yield 424.9 g (98% of theoretical maximum yield based on dosed salt). The material was obtained as a white free flowing powder with a solution viscosity VN of 90 ml/g. The product had melting temperatures observed in the first heating cycle of the DSC measurement, of 327° C. and 368° C., a crystallization temperature of 335° C. and a melting temperature observed in the second heating cycle, of 345° C. The molar ratio in the polymer was 64/36.

The polyamide obtained in Example IX is a polymer with high molecular weight obtained by the process according to the invention in a relative short time wherein the temperature throughout the process was kept below the melting temperatures of the salts.

Example X

Polymer Synthesis from a 6T and 4T Salt Combination (Molar Ratio 50/50) in a Static Reactor The polymerization was carried out under inert atmospheric pressure in a 50 ml electrically heated autoclave, isolated with 2 cm thick glass wool, an inert gas inlet and an exit for both the inert gas and the condensate gas, and a thermocouple to measure the temperature of the reactor wall. The reactor was charged with 10 grams of a dry blend of salt powder comprising 47.5 wt. % of 4T salt and 52.5 wt. % of 6T salt. A nitrogen gas purge of 5 ml/minute was applied to inertize the reactor content. Then nitrogen gas purge was set at 1 ml/minute and the reactor content was heated by heating the reactor wall applying a programmed temperature profile comprising heating to 150° C. with a heating rate of in 5° C./minute, heating from 150° C. to 260° C. with a heating rate of in 1° C./minute, and keeping the temperature at 260° C. for 2 hours. Then the reactor was cooled by removing the glass wool isolation and increasing the nitrogen gas purge to 5 ml/minute. The polyamide obtained in Example X was a polymer in the form of a polymer powder, the polymer having a melting temperature of 330° C. and a viscosity number of 24.

Example XI

Polymer Synthesis from a 6T and 4T Salt Combination (Molar Ratio 50/50) in the Presence of a Catalyst in a Static Reactor Example X was repeated except that it was modified by addition of a catalyst. An amount of 1 wt. % of $NaH_2PO_2 \cdot H2O$ was added to and mixed with the dry blend of 4T salt and 6T salt prior to charging the dry blend into the reactor. The polyamide obtained in Example X was a polymer in the form of a polymer powder, the polymer having a melting temperature of 338° C. and a viscosity number of 36. This example shows that the use of a catalyst results in a higher viscosity, compared to that of Example X, which illustrates that the formation of copolyamides with the process according to the invention can be even faster with the use of a catalyst.

The invention claimed is:

1. A process for the preparation of semi-crystalline semi-aromatic polyamide by direct solid-state polymerization of a solid-state diamine-dicarboxylic acid salt mixture, comprising steps of:
   (a) providing at least two salts of terephthalic acid and diamine, wherein each of the at least two salts of terephthalic acid and diamine is in a solid state and has a melting temperature (Tx) of at least 260° C.;
   (b) preparing a solid state salt mixture of the at least two salts of terephthalic acid and diamine by mixing the at least two salts of terephthalic acid and diamine while maintaining the at least two salts in the solid state;
   (c) conducting solid state polymerization of the solid state salt mixture obtained from step (b) by heating the solid state salt mixture to a temperature (T-c) in the range from 200° C. to Tx and under a pressure below saturation vapour pressure of water at said temperature while maintaining the salt mixture in the solid state to condense and polymerize the at least two salts and thereby form a semi-crystalline semi-aromatic polyamide in a solid state directly from the solid state salt mixture, wherein
   steps (b) and (c) are practiced in the absence of a dispersing agent or solvent.

2. The process according to claim 1, wherein step (c) comprises heating the salt mixture obtained from step (b) in the solid state to a temperature (T-c) in the range from 200° C. to 260° C.

3. The process according to claim 1, wherein each of the least two salts of terephthalic acid and diamine has a melting temperature of at least 280° C., and wherein step (c) comprises heating the salt mixture obtained from step (b) in the solid state to a temperature (T-c) in the range from 220° C. to 280° C.

4. The process according to claim 1, wherein the diamines in the at least two salts of terephthalic acid and diamine are selected from C2-C12 diamines.

5. The process according to claim 1, wherein the at least two salts of terephthalic acid and diamine comprise:
   a first salt (A) of terephthalic acid and a first diamine, and
   a second salt (B) of terephthalic acid and a second diamine, wherein the first diamine and the second diamine are different diamines, and wherein each of the first diamine and the second diamine is a C2-C10 diamine.

6. The process according to claim 5, wherein the at least two salts of terephthalic acid and diamine comprise:
   2.5-97.5 mol % of the first salt (A) of terephthalic acid and the first diamine, and
   97.5-2.5 mol % of the second salt (B) of terephthalic acid and the second diamine, wherein
   the mol % is relative to the total molar amount of the at least two salts of terephthalic acid and diamine in the salt mixture.

7. The process according to claim 5, wherein the salt mixture terephthalic acid and diamine comprises at least one additional salt (C) of terephthalic acid and a third diamine other than the first diamine and the second diamine.

8. The process according to claim 5, wherein the salt mixture consists of:
   5-95 mol % of the first salt (A) of terephthalic acid and the first diamine,
   5-95 mol % of the second salt (B) of terephthalic acid and the second diamine, and
   0-35 mol % of the third salt (C) of terephthalic acid and the third diamine, wherein
   the mol % is relative to the total molar amount of salts of terephthalic acid and diamine in the salt mixture.

9. The process according to claim 4, where the C2-C10 diamine is selected from the group consisting of linear aliphatic diamines, branched aliphatic diamines, cycloaliphatic diamines and arylalkylamines.

10. The process according to claim 1, wherein at least one diamine is selected from the group consisting of C2-C8 diamines.

11. The process according to claim 1, wherein the at least two salts of terephthalic acid diamine are in the form of a powder.

12. The process according to claim 1, wherein step (c) comprises increasing the temperature above 200° C. at a heating rate of at most 5° C. per minute.

13. The process according to claim 1, wherein step (c) comprises keeping the temperature of the mixture at the temperature (T-c) for at least 1 hour in the range from 210° C. to Tx−5° C.

14. The process according to claim 1, wherein the semi-aromatic semi-crystalline polyamide obtained in step (c) has a viscosity number of at least 15.

15. The process according to claim 1, which further comprises the step of:
   (d) subjecting the semi-aromatic polyamide obtained from step (c) to a solid-state post-condensation step by heating the semi-aromatic polyamide, having a melting temperature Tm-pol which is above Tx, to a temperature (T-d) above Tx and at least 10° C. below Tm-pol, thereby further polymerizing the semi-aromatic polyamide and obtaining a semi-aromatic polyamide of higher molecular weight.

16. The process according to claim 1, wherein step (c) is carried out in a reactor, and comprises (i) releasing water produced as water vapour during step (c) upon condensing of the salts, and diamine as diamine vapour from at least one of the salts of terephthalic and diamine, (ii) at least partly separating the water and diamine vapor from each other thereby forming a water-rich fraction and a diamine-rich fraction, and (iii) removing the water-rich fraction from the reactor and retaining the diamine-rich fraction in the reactor or recycling the diamine-rich fraction into the reactor.

* * * * *